United States Patent [19]
Wing

[11] Patent Number: 4,603,483
[45] Date of Patent: Aug. 5, 1986

[54] THERMAL GRADIENT COMPENSATOR FOR FLUID ROTOR GYROSCOPIC APPARATUS

[75] Inventor: Willis G. Wing, Glen Head, N.Y.

[73] Assignee: Sperry Corporation, New York, N.Y.

[21] Appl. No.: 666,004

[22] Filed: Oct. 29, 1984

[51] Int. Cl.$^4$ ............................................. G01C 19/02
[52] U.S. Cl. ...................................... 33/324; 33/316; 33/327; 74/5.41; 73/497
[58] Field of Search ...................... 74/5.41, 5.6 D, 5.5; 33/327, 324, 316, 346, 300, 315; 73/497

[56] References Cited
U.S. PATENT DOCUMENTS

| | | | |
|---|---|---|---|
| 3,058,359 | 10/1962 | Wing | 74/5.6 D |
| 3,186,240 | 6/1965 | Daubert, Jr. | 74/5.5 X |
| 3,200,653 | 8/1965 | Wing | 73/497 |
| 3,813,946 | 6/1974 | Robbin, Jr. et al. | 73/497 |

FOREIGN PATENT DOCUMENTS

| | | | |
|---|---|---|---|
| 956627 | 1/1957 | Fed. Rep. of Germany | 33/327 |
| 150795 | 9/1981 | Fed. Rep. of Germany | 33/327 |

Primary Examiner—William D. Martin, Jr.
Attorney, Agent, or Firm—Howard P. Terry; Arnold L. Albin

[57] ABSTRACT

A fluid sphere gyroscope is used as the north-seeking sensing element in a gyrocompass. A sensor responsive to angular deviation of the gyroscope from the horizontal provides a tilt signal which is used to energize heating elements located along the independent spin axis of a rotating fluid mass. Application of a thermal gradient along the spin axis of the fluid mass causes a controlled precession of the gyroscope, thereby compensating for bias and acceleration sensitive drift errors and precessing the gyroscope about a vertical axis in a controlled manner. Rotary transformers permit inductive coupling of the heating elements to the tilt signal and to a power source with minimal disturbing torques.

17 Claims, 3 Drawing Figures

THERMAL GRADIENT COMPENSATOR FOR FLUID ROTOR GYROSCOPIC APPARATUS

BACKGROUND OF THE INVENTION

1. Field of the Invention

This invention relates generally to gyroscopic apparatus and more particularly to a device for precessing a fluid sphere gyrocompass and compensating for undesirable drift and error characteristics.

2. Description of the Prior Art

The use of a gyroscope as a north-seeking element of a gyrocompass is well known in the art. Basically, the north finding operation of the conventional gyrocompass derives from the phenomenon that when the spin axis of a gyroscope which was originally pointed north is not accurately pointed along the meridian, the gyroscope will rotate about a tilt axis horizontal (relative to the earth) and normal to the spin axis at a rate equal to the horizontal earth rate component of angular velocity along that axis. This rotation results in a tilt of the spin axis away from the horizontal, which can be sensed and used to apply a restoring torque to redirect the spin axis to true north. Thus, to redirect the spin axis in the north-seeking direction, if the gyroscope spin axis varies from its nornal northerly position, a restoring couple may be applied to the tilt axis, normal to the spin axis and the azimuth plane. This precesses the gyro spin axis toward the northerly direction. Direction may then be read from an azimuth card, using the spin axis to indicate north.

Since the north seeking operation is basically oscillatory in simple harmonic motion, means must be provided to damp the oscillation. This has been done by applying an out-of-phase torque to either the horizontal or vertical axis.

It is also well known that a gyrocompass in a two-axis system, gimballed with the tilt axis horizontal and the azimuth axis normal to the spin axis and tilt axis, will not show a correct heading in a rolling or pitching vehicle unless the vehicle is on a cardinal course (north, south, east, or west), due to the so-called intercardinal rolling error which subjects a gyrocompass to a net vertical-axis torque. The influence of symmetrical rolling does not average out on an intercardinal course, and the error may be of the order of 5° for ±10° roll with 8-second periods. Since the pitch angle is generally a smaller source of error, compensation must be provided at least to correct for excessive intercardinal rolling error. This is commonly corrected by providing a delay to the error signal such as by using a ballistic pendulum with a viscous liquid for damping, or electrical delay applied to the signal from an accelerometer. The delay results in a negligible net vertical-axis torque over the roll cycle.

It is further known to those skilled in the art that in order for a gyrocompass to remain continuously pointing north in the presence of vehicular velocity and acceleration, and in a changing latitude, compensation for these dynamic effects, which otherwise result in north pointing error, must be provided. For example, corrections must be applied for the well-known northerly velocity error which results from the settling of the gyro spin axis along the normal to the total horizontal angular velocity vector (vector sum of the horizontal component of the earth angular speed with ship's angular speed about the center of the earth). It is a function of the ship's speed, course, and latitude, and may be corrected either by application of a suitable vertical axis compensating torque to the gyro, or by periodically offsetting the readout angle of the azimuth card. Commonly it is corrected by applying a vertical axis torque proportional to the northerly component of vehicle velocity. This precesses the gyro about the tilt axis at the exact rate required to keep the spin axis tangent to the surface of the earth at all times as the vehicle proceeds in a given direction, and the gyroscope remains centered on the meridian. Preferably, an acceleration correction will also be applied to preclude oscillation about the meridan when the heading or speed is changed.

In addition to the dynamic corrections described above, which are independent of the construction of the gyroscope, corrections are also required for bias and acceleration drift peculiar to the structure of the gyroscope and its mounting arrangement. This includes acceleration sensitive drifts which may occur due to unbalance of the spin and input axes, structural compliance, aniso-elasticity of the mounting members, and bias drifts such as thermal torques, frictional torques due to normal forces on bearings, and electromagnetic and electrostatic torques from stray fields, electrical pick-offs, and torque motors, etc. This list of bias and acceleration sensitive drift responses is by no means comprehensive but is merely illustrative of the potential errors inherent in the gyroscope.

The prior art has described an improved type of gyroscope employing a fluid mass housed in a rotary container, as disclosed by W. G. Wing in U.S. Pat. No. 3,058,359, entitled Fluid Rotor Gyroscopic Apparatus, issued Oct. 16, 1962, and assigned to the assignee of the present invention. The fluid sphere rotor gyroscope offers notable advantages over the conventional form of solid rotor type of gyroscope in that the need for compensating mechanical adjustments for bias and acceleration sensitive drift is minimized. As a result of these characteristics, the fluid rotor form of gyrocompass can provide improved reliability over the conventional gyrocompass with a minimum of assembly, test and calibration time required. In a gyroscope of this type, a cavity or rotor containing a mass of fluid is rotated and thereby spins the fluid body. The fluid body then tends to maintain a fixed orientation in space with changes in the orientation of the container, thereby causing the spin axis of the fluid to deviate from the spin axis of the container. By means of pressure sensitive transducers, mounted within the container, an output signal is provided when the spin axis of the fluid and that of the container are not coincident due to external rotation of the gyroscope. The output signal is representative of the angular difference between the spin axes and is measured as a change in differential pressure in a manner more fully explained in the aforementioned patent.

However, it has been found that when there is an axial temperature difference existing in the fluid which forms the sensitive element, such as may be introduced by dissipation of electrical energy by the rotor driving source, the output signal is in error by what appears as a drift when an acceleration is present. The source of the problem is the axial temperature gradient which causes a density variation in the fluid and a consequent unbalance in the gyroscope. In U.S. Pat. No. 3,200,653, issued Aug. 17, 1965 also to W. G. Wing, and also assigned to the assignee of the present invention, an improved form of the fluid sphere rotor gyroscope uses transverse members of high thermal conductivity along the spin axis to reduce steady state errors due to such thermal gradients. However, that invention does not provide for dynamic corrections, such as to compensate for drifts due to acceleration.

Thus it is seen that the prior art requires numerous corrections to compensate for undesirable bias and acceleration sensitive drifts, and that such corrections may require precise and time consuming adjustments in a conventional rotor gyroscope. The present invention provides a simplified compensation means for the above drift sources which makes controlled use of the acceleration sensitive drift-to-temperature gradient along the spin axis of a fluid sphere rotor gyroscope, which has heretofore disadvantageously been a source of drift and error. The same effect is also utilized to provide a novel way to precess the gyroscope about the vertical axis in a controlled manner to compensate for the vertical component of earth's rate of rotation and to precess the gyroscope spin axis, as required, toward north.

SUMMARY OF THE INVENTION

The present invention is concerned with compensating for undesirable bias and acceleration sensitive drift characteristics of a gyroscopic apparatus, particularly relating to a gyrocompass including a fluid sphere rotor gyroscope. In the fluid sphere gyrocompass advantage is taken of a characteristic which for most applications is a disadvantage: this is the response of the acceleration sensitive drift-to-temperature gradient along the spin axis.

This property is advantageously applied in the present invention by introducing a controlled temperature differential along the spin axis so as to compensate for the aforesaid bias and acceleration sensitive drift errors, and also to precess the gyro about the vertical axis to compensate for the vertical component of earth rotation rate, and to cause redirection of the spin axis towards the meridian.

The invention comprises a gyroscopic apparatus, including a housing, a fluid mass and means for containing the fluid mass within the housing, drive means for spinning the containing means about an axis thereof, so as to spin the fluid mass about a fluid axis, and means communicating with the fluid mass for detecting an angular difference between the spin axis of the fluid and the spin axis of the containing means. The improvement comprises means for providing a tilt signal representative of the inclination of the spin axis from a horizontal axis, and means responsive to the tilt signal for heating the fluid mass to provide a predetermined thermal gradient along the fluid spin axis. Heating of the fluid mass causes a precession about the vertical axis until the spin axis is aligned with the meridian, whereupon the spin axis is also aligned with the horizontal, and the tilt signal is nulled. The precession of the fluid mass is in a direction compensating for bias and acceleration sensitive drift characteristics and may provide a vertical axis rotation rate to correct for earth's rotation.

A gyrocompass using a fluid rotor gyroscope is comprised of a mechanical suspension having a vertical compass axis on which is pivoted a gyroscope for rotation about a horizontal tilt axis, the gyroscope containing a motor driven fluid mass rotatable about a spin axis perpendicular to the tilt axis. A torque precession system is coupled to the vertical and horizontal axes, with drive means for rotation about the respective axes. The torque precession system includes means for heating the fluid mass to provide a predetermined thermal gradient along the spin axis, responsive to the inclination of the gyroscope about the tilt axis, thereby inducing a corrective precession about the vertical axis.

The fluid sphere gyroscope is adapted to a method for reducing operating errors without mechanical adjustments by sensing the precession rate of the gyroscope about an approximately horizontal tilt axis, sensing the precession of the gyroscope about an approximately vertical azimuth axis, sensing the angular deviation of the gyroscope from the horizontal, introducing a horizontal axis torque responsive to the precession rate about the approximately vertical azimuth axis so as to reduce the vertical axis precession rate and introducing a vertical axis torque responsive to the precession rate about the approximately horizontal tilt axis so as to reduce the horizontal axis precession rate, the horizontal axis precession rate made also responsive to the angular deviation of the gyroscope from the horizontal. The method further comprises compensating for a precession of the gyroscope about any acceleration normal to the spin axis by introducing a thermal mass unbalance in the fluid mass along the spin axis, responsive to the deviation of the gyroscope from the horizontal, so as to cause precession about the approximately vertical axis until the deviation is substantially reduced to zero.

DESCRIPTION OF THE PREFERRED EMBODIMENT

Before describing the structure of the present invention, the theory of the fluid sphere gyro heating system operation will first be explained. For simplicity of analysis, one may assume a uniform temperature gradient is present along the spin axis of a rotating container for spinning the fluid mass. Further, under stabilized operating conditions, the spin axis of the fluid will be aligned by viscous forces with the spin axis of the container within less than one minute of arc, hence for all practical purposes these axes may be assumed coincident, and the temperature gradient along the spin axis of the fluid will therefore also be uniform under steady state conditions.

A suitable fluid for use in this application is a perfluorinated liquid, such as type FC-75, distributed by the Minnesota Mining and Manufacturing Co., St. Paul, Minn. This fluid is inert, non corrosive, non-flammable, compatible with electrical components, has a low viscosity, and is stable under thermal stress. FC-75 has a coefficient of expansion of 0.0016 cm$^3$/cm$^3$-° C.

As is well known to those skilled in the art, the rate of precession of a gyroscope about the axis of an applied acceleration is, under steady state conditions, directly proportional to the applied torque and inversely proportional to the angular momentum of the rotor:

$$\omega A = T/(I_Z \omega Z) \tag{1}$$

where:

$\omega_A$ is the precession rate in radians per second,
$I_Z$ is the moment of inertia of the gyroscope rotor in gram cm$^2$/sec, and
$\omega_Z$ is the angular rate of spin of the gyroscope rotor in rad/sec,
T is the applied torque due to the acceleration, in dyne cm.

Under the aforesaid assumptions, in a fluid sphere gyroscope the resultant precession rate about the axis of an applied acceleration (normal to the spin axis) will be a function of the fluid expansion coefficient, the applied acceleration, the thermal gradient, and the gyroscope spin speed, $$\omega A = (KAG)/(2\Omega) \qquad (2)$$

where:
$\omega_A$ is the precession rate in radians per second,
K is the fluid expansion coefficient in cm$^3$/cm$^3$-° C.,
A is the applied acceleration in cm/sec$^2$,
G is the thermal gradient in °C./cm, and
$\Omega$ is the gyroscope spin speed in rad/sec. Using a value of 0.0016 cm$^3$/cm$^3$-° C. for K, 980 cm per sec$^2$ for A and 628 radians per second (100 RPS) for $\Omega$, it is found that, for precession $\omega_A$ at 15° per hour, which is equivalent to $7.293 \times 10^{-5}$ rad/sec (maximum vertical earth rate), the value of G must be 0.058° c/cm.

Further, assuming a uniform temperature gradient within the fluid sphere and a diameter of 3.81 cm, the resultant temperature differential $\Delta T$ along the spin axis will be $$\Delta T = 0.058 \times 3.81 = 0.22° C. \qquad (3)$$

Because a temperature gradient of this magnitude can be maintained by a relatively modest differential heating, the required vertical axis precession rate in the fluid gyro compass is readily generated by use of such heating.

A gyrocompass mounted in a vehicle undergoing changes in course and speed is subject to acceleration components along the spin axis which create, through the control mechanism, a torque about the tilt axis, resulting in azimuth precession. This error may be minimized by choosing an appropriate oscillatory period for the north finding operation, known as Schuler tuning. The desired period must be low enough so that the gyro does not hunt about the northerly position, but high enough so that the static azimuth error is minimized. The oscillatory period of the north finding operation can be set to a desired value (preferably about 84.4 minutes) by setting a predetermined relationship between vertical axis precession rate and the differential heating power, and between tilt angle and differential heating power. For purposes of illustration, the operational parameters obtained will assume no damping of the vertical axis.

Since the period is a function of latitude, normal practice is to design the compass for the desired period at a mid-latitude (say 45°) and to accept whatever period results at other latitudes. Using a period of 5064 seconds (84.4 minutes) and a latitude of 45° requires a ratio of spin axis precession rate to tilt angle of 0.02985 radians per second per radian of tilt or 107.5 degrees per hour per degree of tilt. In a preferred embodiment rate about the vertical axis of 232 degrees per hour under the influence of normal earth's gravity. For this gyroscope the electronic system gain would preferably be chosen to provide 0.463 watts of differential heating for a tilt of one degree; thus, at a 45° latitude the differential heating power required would be 0.0457 watt.

The desired relationship between differential heating power and tilt to maintain the oscillatory period previously set forth with tilt axis damping may readily be determined by one skilled in the art. It is known to those skilled in the art that a system with error feedback may oscillate in simple harmonic motion. Damping applies a retarding force in a direction to reduce the undesired oscillation, but introduces a steady state error, since it retards the output of the associated servo.

For a fluid sphere of 3.81 cm diameter, the temperature differential $\Delta T$ required for the desired period is 0.58° C./° tilt. With a temperature differential $\Delta T$ of 0.156° C. at 45° latitude, the resultant tilt angle is 0.099°. It may be shown that the use of damping will result in a north pointing error due to a horizontal axis rate caused by damping. For 0.2 critical damping at 45° Lat. this would be 0.96°. However, this error may be corrected by integration of the tilt signal, which will cancel any steady state tilt. An appropriate time constant of integration has been found to be about one hour. Alternatively, by applying a damping torque which operates only on the oscillatory or transient error, but not the steady state motion of the system, the damping error can be minimized.

Figure 1:
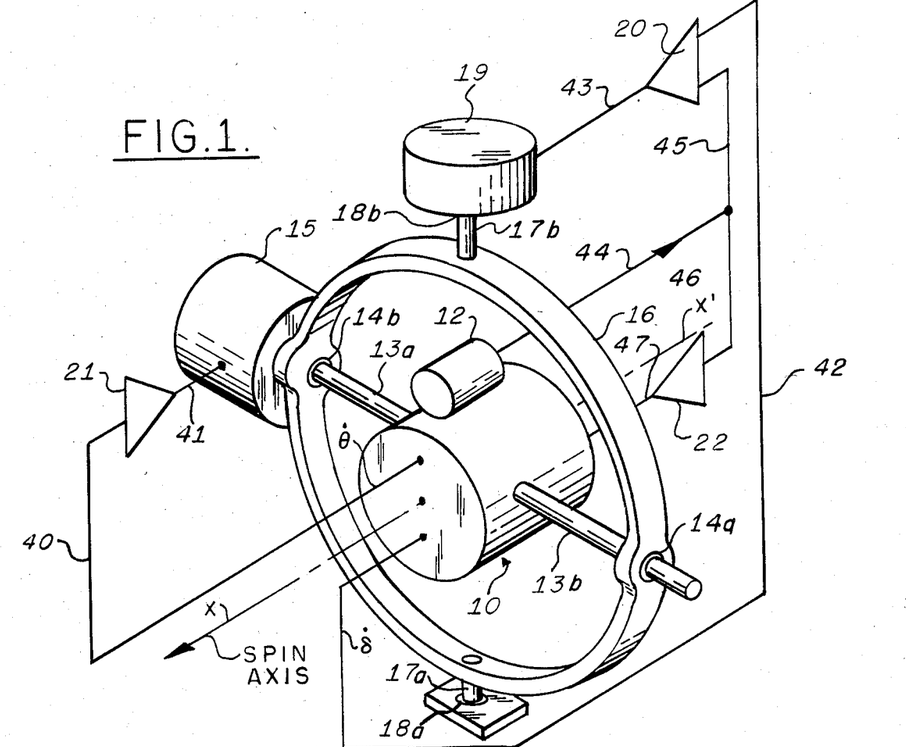
FIG. 1 is a schematic drawing in perspective, showing a simplified gyrocompass control system using the thermally compensated fluid rotor gyro of the present invention.

Referring now to FIG. 1, the basic elements of a gyrocompass incorporating the fluid sphere gyroscope of the present invention are shown. It should be understood that this is illustrative only and shows the device in its most elementary form; it is also configured on the basis that the gyroscope has a relatively high angular momentum fluid-containing rotor whereby it has high resistance to angular displacement and control of a particular axis may be obtained by applying a torque on an orthogonal axis. It is also an advantage of the high angular momentum rotor that there is thereby provided a high degree of inherent direct stabilization which reduces control demands on the torque motors required on the gimbal axes.

The gyroscope is enclosed in a housing 10 and has its spin axis oriented longitudinally along the cylindrical axis x-x' of the housing in the manner described in said U.S. Pat. No. 3,058,359. The relative angular difference between the fluid spin axis and the spin axis of the housing may be sensed by a pressure differential pickoff, as more fully described in the aforementioned U.S. Pat. No. 3,058,359, which is hereby incorporated by reference.

Mounted on housing 10 is a level transducer 12 which provides an electrical signal proportional (for small angles) to the tilt of the spin axis away from the horizontal, referenced to the earth's gravitational force. Level transducer 12 may be comprised of an electrolytic level, a pendulous potentiometer, an accelerometer, or other means responsive to changes in inclination for providing a signal representative of the angular difference between the spin axis of the housing and an essentially horizontal axis.

Housing 10 carries trunions 13a and 13b which are supported by a first bearing 14a and a second bearing 14b carried in gimbal 16; these bearings provide for free rotation of housing 10 about an essentially horizontal axis defined by trunions 13a, 13b and coupled to motor 15 which provides for the application of torque to housing 10 about the horizontal axis. Element 16 is an essentially vertical gimbal provided with axial trunions 17a and 17b; these trunions are supported by a third bearing 18a and a fourth bearing 18b in motor 19. Bearing 18a and motor 19 are supported, in turn, by structure (not shown) attached to the carrying vehicle. The bearings on trunions 17a, 17b provide for free rotation of gimbal 16 about an essentially vertical axis defined by trunions 17a, 17b, and motor 19 provides for application of torque through trunion 17b to gimbal 16 and, hence, to housing 10 about the substantially vertical axis.

Amplifiers 20, 21, and 22 are provided to complete the system; they are conventional servo amplifiers whose functions are as follows: The gyroscope in housing 10 provides an electrical signal with an amplitude and phase proportional to $\theta$ representing the space rate of rotation about the essentially vertical axis and an electrical signal with an amplitude and phase proportional to $\delta$ representing the space rate of rotation about the essentially horizontal tilt axis. Signal $\theta$ is coupled to amplifier 21 by conductor 40 and thence to motor 15 by conductor 41. Signal $\delta$ is coupled to one input of amplifier 20 by conductor 42. A tilt signal from level transducer 12 is coupled to a second input of amplifier 20 and to amplifier 22 by conductors 44, 45 and 46, respectively. The signal output of amplifier 22 is coupled via conductor 47 to a plurality of heating elements within the housing 10, disposed along the spin axis x-x'. The signal output of amplifier 20 is coupled to drive motor 19 by conductor 43.

Figure 2:
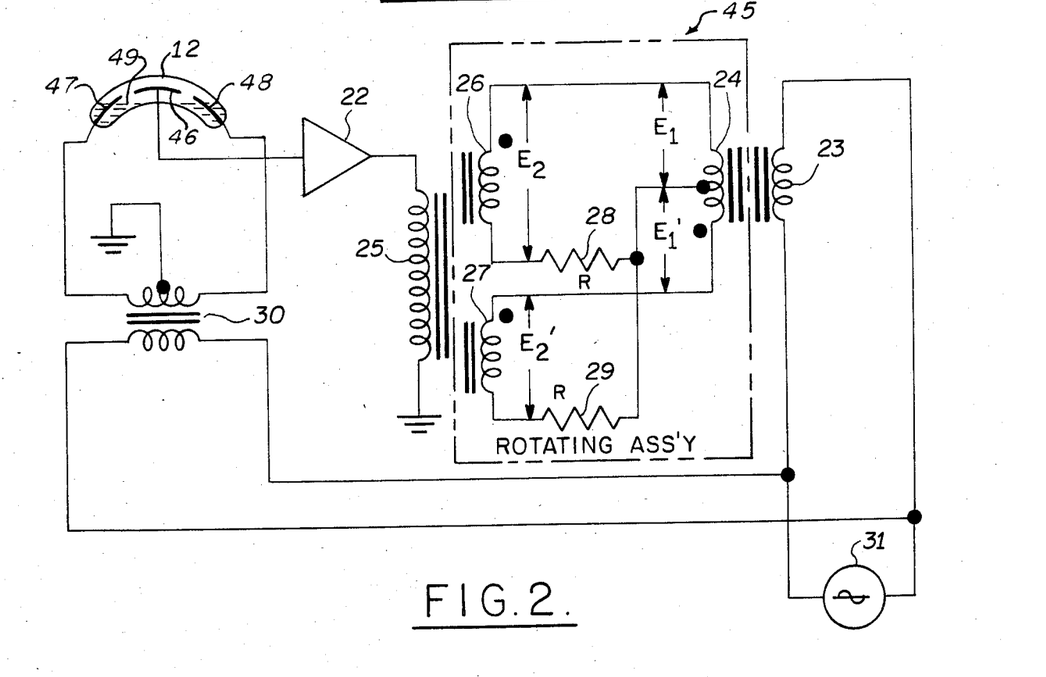
FIG. 2 is an electrical schematic diagram showing a heater energizing circuit for the present invention.

The hardware used to implement the system of FIG. 2 may be selected from any one of several common and readily available commercial devices suitable for the purpose. Thus, the amplifiers may be implemented from analog circuits such as operational amplifiers configured to provide the required gains. A suitable tilt sensor is an electrolytic bubble level such as the type made by Spectron Glass and Electronics, Inc., Uniondale, N.Y. 11553 for a variety of gyroscopic applications. Inasmuch as each of the functional units represented may be any one of the numerous devices for each respective function well known in the art, it is deemed unnecessary to show circuit details.

Referring now to FIG. 2, a schematic diagram is shown of the combination of elements required to provide controlled differential heating of the liquid body inside the rotating container 45 in proportion to the sensed tilt. The combination shown provides a means for applying power to the heating elements. The system heats the fluid mass to a substantially uniform temperature gradient along the fluid spin axis in response to excitation from the tilt sensor, so that increased tilt angles result in greater applied energy to the heating elements, thereby inducing a corresponding precession of the gyroscope to restore the housing tilt axis to the horizontal, in a manner to be described.

The level transducer 12 is optionally shown herein as a gravity sensitive device, such as the electrolytic level discussed above, and is excited from an a.c. source 31 by the balanced secondary of a transformer 30. Other sensors capable of providing an electrical output proportional to a tilt of the spin axis may also be utilized by adapting suitable driving circuitry, as is well known to those skilled in the art. A level signal from a centrally disposed contact 46 of transducer 12 is coupled to amplifier 22 and thence to the primary winding 25 of a rotary transformer. This transformer may be of the type shown by the present inventor in U.S. Pat. No. 2,432,982, issued Dec. 23, 1947, which is hereby incorporated by reference. This transformer couples power between the rotating container 45 and the stationary amplifier 22.

Power from primary winding 25 is transferred to balanced secondaries 26 and 27 of the rotary transformer across cylindrical air gaps in the core, these gaps being provided to allow for free rotation of the gyro assembly. A second similar rotary transformer transfers power from the a.c. power source 31 to a primary winding 23 and thence to a center-tapped secondary winding 24. It will be clear to one skilled in the art that the turn ratios and wire sizes will be adapted to the applied voltages and currents desired. Connections internal to the rotating assembly are made such as to put the sum of the transfer voltages ($E_1 + E_2$) across resistive heating element 28 and the difference voltages ($E_1' - E_2'$) across resistive heating element 29. Secondary windings 24, 26, and 27 and heating elements 28 and 29 are located within the rotating container 45 so as to permit transfer of power wholly by inductive means, without the necessity for friction-bearing contacts or slip rings. For convenience, although other resistance values and dissipation factors may be selected, heating elements 28 and 29 are selected to be resistors of equal magnitude R, of approximately 1 watt total dissipation. The voltage across resistor 28 is seen to be the algebraic sum of $E_1$, derived from secondary winding 24, and $E_2$, derived from secondary winding 26. Similarly, the voltage drop across resistor 29 is seen to be $E_1' - E_2'$, since the transformer secondaries 24 and 27 are connected in series opposing. Since $E_1 = E_1'$ and $E_2 = E_2'$ the differential power dissipated is then $$P_1 - P_2(4/R)E_1E_2 \qquad (4)$$

where
$P_1$, $P_2$ is power in Watts
$E_1$, $E_2$ is potential difference in Volts
R is resistance in Ohms.

By placing resistor 28 at one side of the fluid sphere and resistor element 29 on the opposing side, said positions being arbitrarily denominated and interchangeable without effecting the operation of the system, and with the aforesaid resistors symmetrically disposed along the spin axis, the desired differential heating power $P_1 - P_2$ will be applied along the spin axis of the fluid mass.

Figure 3:
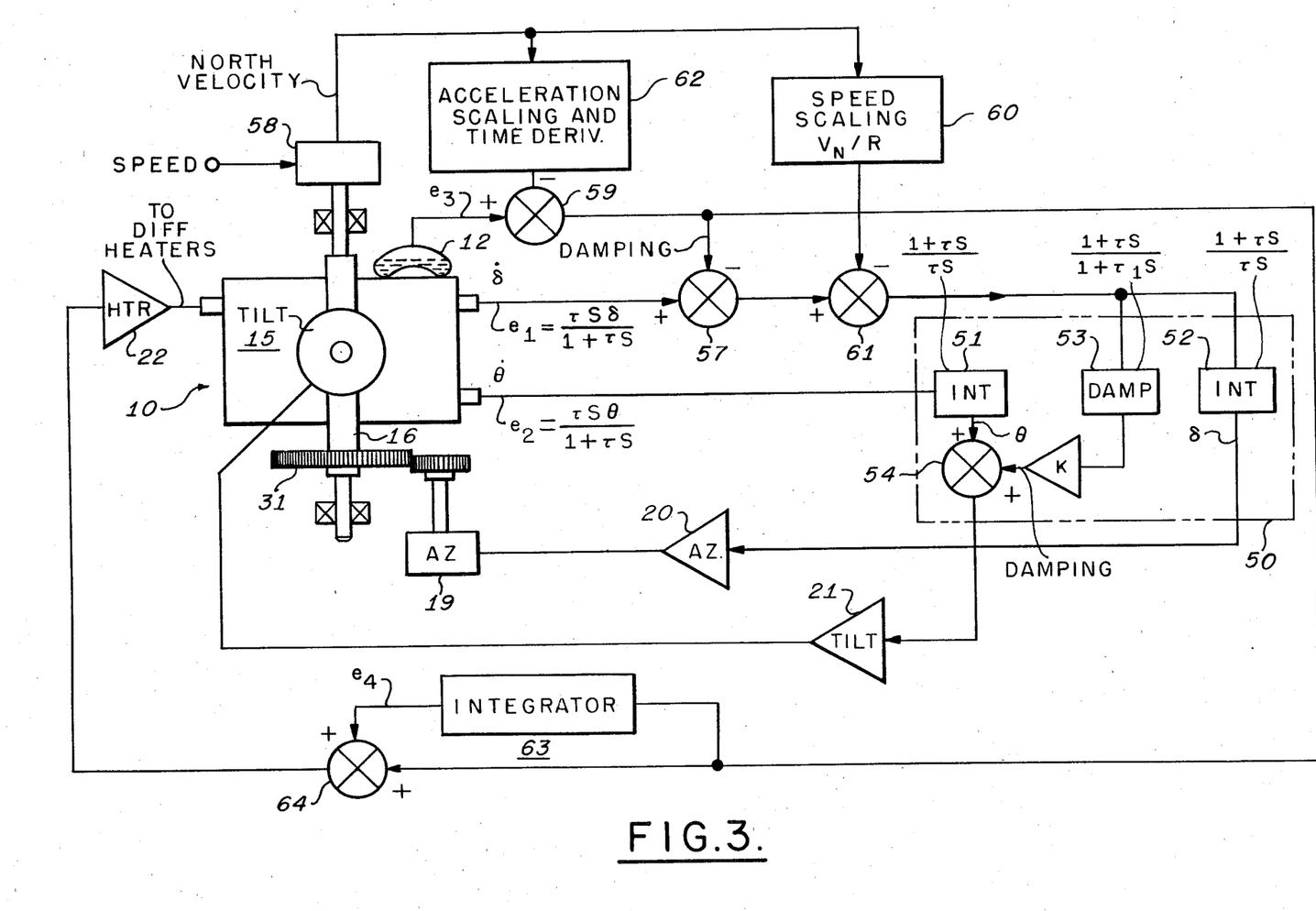
FIG. 3 is an electrical schematic diagram showing a gyrocompass embodying the invention.

Referring now to FIG. 3 a block diagram of a gyrocompass system embodying the present invention is presented, with features to correct for damping error, velocity errors, earth rotation, bias and acceleration sensitive drift, and other dynamic error sources. The gyroscope comprises a fluid-sphere rotor within the housing 10, pivoted on a horizontal tilt axis coupled to electrical torquer 15, for driving the tilt axis of the gyroscope in response to a signal from amplifier 21.

Mounted on housing 10 is the level transducer 12 for producing a signal proportional in amplitude and polarity to the angular tilt and direction of inclination of housing 10. While a level transducer can be built to carry enough power so that differential heaters and torquers may be driven directly wihout the need for intermediate amplifiers, in the preferred embodiment herein intermediate amplifiers 20 and 22 are shown.

Housing 10 includes a rotary container, shown at 45 in FIG. 2, enclosing a mass of fluid which when spun by the cavity assumes an independent spin axis, and provides output signals $e_1$ and $e_2$ representative of the angular difference between the container spin axis and the fluid spin axis. It should be understood, however, that $e_1$ is a measure of tilt rate at low frequencies and $e_2$ is a measure of azimuth rate at low frequencies; because these are rate measures the gyroscope can be driven in tilt by offsetting $e_1$ and in azimuth by offsetting $e_2$. Heating elements and control circuitry, as shown in 45 of FIG. 2, are also located within the rotary container.

The gyrocompass includes a vertical gimbal 16 which supports tilt torquer 15 and the pivoted housing 10. Drive motor 19 is coupled to gimbal 16 by a conventional gear train 31, thereby applying torque about the azimuth axis and causing precession of container 10 about the tilt axis in response to signals from amplifier 20. Also coupled to gimbal 16 is synchro resolver 58, which derives a northerly velocity component from a ship's speed log input when the compass is settled on the meridan. The north velocity signal from resolver 58 is processed through acceleration scaling and differentiating circuit 62 to provide an acceleration correction to compensate for response of the tilt sensor 12 and summed in junction 59 with signal $e_3$ from sensor 12. The summed signal of junction 59 feeds an integrating circuit 63 and summing junction 64 and is then directed to amplifier 22, which energizes the fluid gyroscope heating elements.

The tilt rate signal $e_1$ is coupled to summing junction 57 with the sum signal from junction 59 to provide damping of the tilt axis, in a manner to be described. The sum signal from junction 57 feeds a further summing junction 61, which is provided with a ship's velocity signal from speed scaling circuit 60, also energized by resolver 58, to provide a northerly velocity correction. The resultant signal is coupled to an integrator circuit 52.

The azimuth rate signal $e_2$ is coupled to integrator circuit 51. Circuit 50 provides conventional circuits 51, 52, 53, and gain K, for shaping the input signals $e_1$ and $e_2$ for combining $e_1$ and $e_2$ at summing junction 54. The signals are thereby scaled to provide suitable gain and time constants for control of the gimbal torquers and their relative precession rates and for nutation damping, as is well known to those skilled in the art. The output of integrator 52 is coupled to azimuth amplifier 20, which energizes motor 19 to apply torque about the azimuth axis thereby precessing the gyroscope about the tilt axis in a direction to null the output of junction 61. An output from junction 61 is also supplied to damping circuit 53 and scaled in gain K to damp the nutational mode of oscillation. The output of gain K is combined in summing junction 54 with the output of integrating circuit 51 and coupled to tilt amplifier 21, which drives motor 15 to apply torque about the tilt axis and precess the gyroscope about the azimuth axis until voltage $e_2$ is enulled.

In operation the basic requirements of the gyrocompass are that the spin axis x-x' of housing 10 shall remain horizontal and that the spin axis shall continue to point in a fixed direction in the horizontal plane, say, north. The tilting effect which occurs when the gyro spin axis is not exactly in a north-south plane can be made to precess the gyro towards the meridian by sensing the inclination of housing 10 and by providing an azimuth precession rate signal through the mechanism of differential heating. In the description herein, the term "tilt axis" refers to the substantially horizontal axis about which housing 10 is pivoted, and the term "azimuth axis" refers to the substantially vertical axis about which gimbal 16 is pivoted.

The combination of amplifiers 20 and 21, torquers 15 and 19, and the elements contained in filter circuit 50 all cooperate to keep the two signals $e_1$ and $e_2$ very small in magnitude. The spin axis of housing 10 is "slaved" tightly to the spin axis of the fluid body and, with the exception of small angular displacements due to inputs at summing junctions 57 and 61, all angular motions about the axis of housing 10 must be the result of precession of the fluid ball. Because the natural frequency of the slaving loops will, typically, be in the order of 30 $H_z$ while the natural frequency of the compass (north seeking) operation is of the order of 0.0002 $H_z$ (84.4 minute period) there is a ratio of 150,000 between these frequencies and they may be considered completely decoupled. With these considerations in mind, the operation of the system of FIG. 3 will be explained in terms, firstly, of the slaving action, and secondly, in terms of the compass action.

As noted above, the fluid sphere gyroscope provides two electrical signals $e_1$ and $e_2$, representative of the angular displacements between the axis of the rotating container 45 within housing 10 and that of the fluid mass about the tilt axis and azimuth axis respectively. The tilt angle between the axes may be referred to as $\delta$ and the azimuth angle between the axes as $\theta$. The signal $e_1$ may be considered to have a magnitude proportional to the angular rate of rotation about the tilt axis at the compass loop frequency and a sign indicative of the direction of the applied rotation vector. The signal $e_2$ may similarly be considered to have a magnitude proportional to the angular rate of rotation about the azimuth axis and a sign indicative of the direction of the applied rotation vector. Since these signals are seen from FIG. 3 to be delayed derivative functions of the angular inputs, at the slave loop frequency where the term $\tau S$ is large compared to unity they may be viewed as angular displacement terms.

Voltage $e_1$ is of the form $$e_1 = \frac{\tau S \delta}{1 + \tau \delta} \tag{5}$$

where S is the Laplacian operator, and $\tau$ is a time constant associated with the lag in alignment of the container spin axis with the fluid spin axis.

Voltage $e_1$ (neglecting for the moment the inputs summed at junctions 57 and 61) is coupled to integrator circuit 52 having a transfer function (approximately):

$$e_O = \left( \frac{1 + \tau S}{\tau S} \right) \epsilon_I \tag{6}$$

where $\epsilon_I$ represents a step input voltage due to displacement applied to the tilt axis, and $\tau$ has the same value as in equation (5). Thus the output of the integrator 52 at the slave loop frequency is the tilt axis angular displacement:

$$e_O = \frac{(1 + \tau S)}{(\tau S)} \frac{(\tau S \delta)}{(1 + \tau S)} = \delta \tag{7}$$

The integration may be performed by an analog circuit such as an operational amplifier appropriately configured with an RC feedback loop to perform the integration function. Thus integrator circuit 52 modifies $e_1$ so that the output signal of the circuit is a voltage proportional to the angular displacement δ of housing 10 about the tilt axis. The resultant signal is fed to a conventional power amplifier 20 and from there to torque motor 19. Torque motor 19 applies an azimuth torque to housing 10 through gear train 31 and gimbal 16; this torque is resisted by the angular momentum of the metallic rotor (fluid ball container 45), which precesses about the tilt axis to reduce the voltage $e_1$ to zero by aligning the spin axis of the housing 10 with the spin axis of the fluid ball.

A similar action occurs with respect to voltage $e_2$, which is passed through integrator 51, whose structure and operation is similar to integrator 52, and applied to amplifier 21 and torque motor 15 to apply a torque to the tilt axis. This causes the azimuth precession of the fluid ball container 45 to reduce $e_2$ to zero by aligning the azimuth axis of the housing 10 with the spin axis of the fluid ball.

There is, in the azimuth channel, a difference from the tilt axis channel, in that there is added to the integrated signal O at summing junction 54 a nutation damping signal. This damping signal is derived from $e_1$ by the action of the damping network 53 and gain K. Damping circuit 53 is a network having a transfer function of the form:

$$e_O = \left( \frac{1 + \tau S}{1 + \tau_1 S} \right) e_I \quad (8)$$

where $\tau_1$ represents a delay factor interposed by any realizable circuit. Voltage $e_1$ is modified by damping circuit 53 to provide a delayed tilt rate term having a much smaller time delay with respect to $\epsilon$ than that of $e_1$ (about 0.001 second rather than about 0.3 second); this tilt rate-term, properly gainscaled by K, provides an additional component of torque at the tilt axis which is appropriate to damp the nutational mode (a frequency, typically, of about 30 $H_Z$).

The two loops above described provide tight slaving of the axis of housing 10 to the spin axis of the fluid ball so that various disturbing torques acting on housing 10 (such as bearing friction, etc.) are resisted by torquers 15 and 19, with negligible resultant angular motion of the axis of housing 10.

The compass action depicted in FIG. 3 will now be considered. If the axis of housing 10 is not pointing accurately north there will be a component of earth rotation rate about the tilt axis and the housing will rotate relative to the earth about this axis. To the extent that the housing axis is not level, there will be a signal $e_3$ from sensor 12; the primary use of the "off-level" signal $e_3$ is as an input to amplifier 22 which supplies voltage to the differential heaters in the fluid gyroscope and which, as was previously explained, results in precession of the fluid ball (and, hence, the slaved axis of housing 10) about the vertical axis toward alignment with north.

Since an undamped gyro will exhibit harmonic oscillations about both the tilt and azimuth axes, an undamped compass would not be useful aboard a ship, which is subject to frequent changes in course and speed. However, since the undamped spin axis traces an elliptical path, damping may be accomplished by applying an out-of-phase torque proportional to the deflection along either the major or minor axis of the ellipse. This will convert the elliptical path to a spiral which continually diminishes in amplitude with successive swings of the compass. Damping is accordingly provided by the signal $e_3$ coupled through summing junctions 59, 57, and 61 to amplifier 20 and azimuth motor 19. In addition to its application to the input of amplifier 22 to precess the gyroscope in accordance with the earth's vertical rate of rotation, it will be seen that the off-level signal $e_3$ is algebraically summed with $e_1$ at junction 57. This application of the summed signal causes the slaving loop to act to maintain $e_1$ at the corresponding level $e_3$ because it is nulling with the difference voltage rather than $e_1$. That is, the loop will settle with $e_1 = -e_3$ at junction 57 to provide a resultant null output. Because $e_1$ is not now zero, there is an angular difference between the container spin axis and the fluid ball spin axis and the resultant viscous shear torque precesses the fluid ball about the tilt axis, thus causing the control loop to rotate housing 10 about the tilt axis. The sense of this motion is made such as to reduce the off-level signal and thus damp the compass loop oscillations, so that the housing ultimately settles with the tilt axis aligned with the horizontal.

It will further be seen in FIG. 3 that there is an integrator loop 63, which operates on the off-level signal $e_3$; the output $e_4$ of the integrator circuit is summed in junction 64 with the input $e_3$ to provide a drive signal to heater amplifier 22. The integrator response may be approximated by a low-pass filter which passes frequencies low compared to the (0.0002 Hz) but essentially rejects this frequency. The output of the integrator will continue to increase as long as there is an off-level error signal. This output signal is applied to the heater in such a polarity that the resulting fluid mass precession causes the housing 10 to rotate toward the meridan. The change in the earth rate component about the tilt axis then levels the spin axis. Any long-term drift is slowly biased out, and the integrator comes to rest when the error signal to heater amplifier 22 is nulled, showing that the spin axis is horizontal. Thus, the compass loop in the steady state will settle with the spin axis essentially horizontal, and no off-level signal will result, even though, in general, a signal is required at the input to amplifier 22 to energize the heaters to correct for the vertical component of earth rate, vertical axis drift, damping, etc. Since, for a gyrocompass moving in inertial space, the earth's rate component is constantly changing, the integrator in fact will never settle to a steady state value. Further, for compass loop stability, the preferred embodiment incorporates an integration time constant of the order of one hour, so that the signal supplied to amplifier 22 and the fluid sphere heaters lags behind the currently required signal level for full tilt compensation. However, this error, even in the worst case, is a fraction of one degree, while the north-pointing error would otherwise be of the order of several degrees. It is, of course, necessary in the design of the overall compass loop to take into account the influence of integrator loop 63 on the stability and damping of the compass loop, but this is readily done by one skilled in the art.

It was noted heretofore that a two-axis gyroscope is also subject to a north pointing error when the precession of the gyroscope is not about a true vertical axis but is about an axis related to the carrying vehicle. Beneficially, it is an inherent property of the present invention that a thermally compensated fluid sphere gyroscope will precess at a resultant rate which is always about the applied acceleration vector (normal to the spin axis), which must be vertical when an average direction over a significant time period is considered, due to the integrating effect of the thermal time constant of the system and the relatively symmetrical sinusoidal nature of the rolling and pitching of the vehicle. In effect, the oscillations about the vertical axis are filtered out. This approach is identical in result to the common use of a liquid ballistic to control the north seeking operation of the conventional gyrocompass in the presence of rolling or other accelerations, wherein a liquid contained in a system of interconnected reservoirs is caused to flow under the influence of gravity so as to introduce a torque about the tilt axis, which causes the gyroscope to precess in azimuth until the spin axis is aligned with the meridian.

Because the level sensor will give a false indication of tilt if there is any acceleration along its sensitive axis (i.e. a northerly ship acceleration) there will be a transient compass error induced by such an acceleration if not corrected. This error results both from the influence of this false tilt signal on the differential heating and through the compass loop damping. Further, when the ship is proceeding in a direction having a northerly component of velocity, the apparent horizontal earth rate, which is the vector sum of earth's rate component and the ship's component of velocity in the northerly direction, will result in the compass settling in a direction which differs from the true meridan. Referring to FIG. 3, circuit elements 58, 60, 62, and junctions 59 and 61 provide for the correction of northerly speed and acceleration errors. It will be seen that there is a synchro resolver 58 on the azimuth axis and that ship's speed is an input to this resolver. Resolver 58 is so adjusted that an output corresponding to the northerly component of ship speed (assuming that the compass is pointing north) is provided to junctions 59 and 61. Since a velocity of one knot is one minute of arc per hour at the surface of the earth it is seen that it is simple to scale ship's northerly velocity to an angular velocity about the earth's center, as provided by gain scaling circuit 60. This scaling factor is simply $V_N/R$, where R is the radius of the earth, and $V_N$ is the northerly component of velocity. Because it is necessary to precess the gyroscope about the tilt axis at the angular rate corresponding to ship's northerly velocity to maintain a level condition, a correction for the calculated velocity is algebraically summed at junction 61 with signal $e_1$. By use of this correction the value of $e_1$ is offset, as required, to precess the housing 10 about the tilt axis at exactly the desired rate to keep the spin axis tangent to the surface of the earth at all times, and prevent the appearance of a north pointing error with would otherwise result.

In addition, a derivative circuit 62 is shown; by differentiating the north velocity signal this circuit provides an indication of the ship's northerly acceleration. This acceleration signal, suitably gain scaled, is subtracted from the signal $e_3$ of level sensor 12. As a result of this correction, the output of junction 59 is a true measure of the tilt of the axis of housing 10 independent of ship's acceleration; without this correction, a change in ship's northerly speed would cause an oscillatory error at the compass loop natural frequency. The acceleration correction assures a dead beat azimuth response to changes in heading and speed. Both speed and acceleration corrections should be implemented if a north velocity correction is desired.

While the invention has been described in its preferred embodiments it is to be understood that the words which have been used are words of description rather than limitations and that changes may be made within the purview of the appended claims without departing from the true scope and spirit of the invention in its broader aspects.

I claim:

1. In a gyroscopic apparatus comprising a housing, a fluid mass, means for containing said fluid mass within said housing, drive means for spinning said containing means about an axis thereof, thereby also spinning said fluid mass about a fluid axis, and means communicating with said fluid mass for detecting an angular difference between said spin axis of said fluid and said spin axis of said containing means, the improvement comprising:

means for providing a tilt signal representative of an angular difference between said spin axis of said containing means and an essentially horizontal axis; and means responsive to said tilt signal for heating said fluid mass to provide a predetermined thermal gradient along said fluid spin axis.

2. A gyroscopic apparatus as set forth in claim 1, wherein said means for heating said fluid mass comprises:

heating element means for said spinning fluid, disposed along said spin axis of said containing means; and means coupled to said heating element means, for providing power signal to establish said predetermined thermal gradient.

3. A gyroscopic apparatus as set forth in claim 2, wherein said means for providing a power signal further comprises:

means for coupling energy to said heating element means from said tilt signal and said power signal; and means for forming a sum and difference of said tilt and power signals at said heating element means.

4. Apparatus as set forth in claim 3, wherein said heating element means comprises a plurality of discrete elements and said means for coupling energy to said heating element means further comprises:

means for coupling said sum of said signals to one of said heating elements; and means for coupling said difference of said signals to one other than said one of said heating elements.

5. Apparatus as set forth in claim 4, further comprising:

means for coupling essentially constant energy from said power signal means to said heating element means; and means for coupling variable energy responsive to said tilt signal to said heating element means;

said means for forming a sum and difference including means for combining said essentially constant energy and said variable energy so that said plurality of elements are differentially energized to provide greater energy to one of said heating elements when said containing means spin axis is inclined in a first direction thereof with respect to said horizontal axis and for providing greater energy to one other than said one of said elements when said containing means is inclined in an opposing direction along said axis.

6. Apparatus as set forth in claim 5, wherein said means for coupling constant energy to said heating element means from said power signal means includes first rotary transformer means; and said means for coupling variable energy to said heating element means includes second rotary transformer means.

7. Apparatus as set forth in claim 6, wherein said means for providing a tilt signal comprises level means responsive to gravitational forces and coupled to said containing means parallel to said spin axis thereof, so that said tilt signal is responsive to the sense and inclination of said containing means with respect to said essentially horizontal axis.

8. Apparatus as set forth in claim 1, wherein said tilt signal means includes accelerometer means.

9. Apparatus as set forth in claim 8, wherein said accelerometer means includes bidirectional electrolytic level means.

10. A gyrocompass comprising:
a mechanical suspension including a support rotatable about an approximately vertical compass axis;
a gyroscope pivoted on said support for rotation about an approximately horizontal tilt axis;
a motor driven fluid gyroscopic mass contained within said gyroscope for rotation about a spin axis perpendicular to said approximately horizontal tilt axis; and
a torque precession system including drive means about said approximately vertical axis and said approximately horizontal tilt axis;
wherein said torque precession system further comprises means responsive to an inclination of said gyroscope about said tilt axis for heating said fluid mass to a predetermined thermal gradient along said spin axis and for inducing a corrective precession about said approximately vertical compass axis.

11. A gyrocompass as set forth in claim 10, further comprising:
means for differentially heating said fluid mass along said spin axis, thereby to provide a precession of said fluid about said vertical axis.

12. The gyrocompass as set forth in claim 11, further comprising:
means coupled to said fluid mass for sensing an inclination of said spin axis about said tilt axis;
means responsive to said inclination sensing means for providing a signal representing said inclination, coupled to said vertical axis drive means;
means coupled to said fluid mass for sensing an angular deviation about said vertical axis;
means responsive to said vertical axis sensing means for providing a signal representing said angular deviation, coupled to said drive means for said tilt axis;
means coupled to said gyroscope for sensing said inclination of said gyroscope about said tilt axis; and
means for providing a signal to said torque precession system, responsive to said means for sensing inclination of said gyroscope about said tilt axis, for heating said fluid mass.

13. The gyrocompass as set forth in claim 12, further comprising:
integrator means, responsive to said signal for heating said fluid mass and coupled to said means for differentially heating said fluid mass, for providing a control signal integrated with respect to time whereby an acceleration component of said inclination signal is nulled to zero in the presence of an acceleration, and for biasing out any long term drift.

14. The gyrocompass as set forth in claim 13, further comprising:
means for combining at least a portion of said signal for heating said fluid mass with said spin axis inclination signal in phase opposition thereof, to provide a signal for damping oscillations of said gyroscope about at least one of said vertical and horizontal axes.

15. The gyrocompass as set forth in claim 14, further comprising means for combining at least a portion of said damping signal with said angular deviation signal for said tilt axis drive means, to provide nutation damping of said gyroscope.

16. The gyrocompass as set forth in claim 15, further comprising:
means for deriving a signal representing a northerly acceleration component of said gyroscope;
means for deriving a signal representing a northerly velocity component of said gyroscope;
means for combining at least a portion of said acceleration component with said signal responsive to the inclination of said gyroscope to provide a northerly acceleration correction signal,
means for combining at least a portion of said velocity component with said spin axis inclination signal to provide a northerly velocity correction signal; and
means for coupling said velocity and acceleration correction signals to said precession system.

17. A method for reducing operating errors in a gyrocompass having a fluid sphere gyroscope with an approximately horizontal spin axis, comprising:
sensing the precession rate of said gyroscope about said approximately horizontal tilt axis;
sensing the precession rate of said gyroscope about an approximately vertical azimuth axis;
sensing the angular deviation of said gyroscope from the horizontal;
introducing a torque about said tilt axis responsive to said precession rate about said approximately vertical azimuth axis in a direction so as to reduce said precession rate;
introducing a torque about said azimuth axis responsive to said precession rate about said tilt axis so as to reduce said precession rate, also responsive to said angular deviation, and
compensating for a precession of said gyroscope about any acceleration normal to said spin axis by introducing a thermal mass unbalance in said fluid along said spin axis, responsive to said angular deviation, so as to cause precession about said approximately vertical axis until said deviation is substantially reduced to zero.

* * * * *